United States Patent [19]

Maurer

[11] Patent Number: 5,253,294
[45] Date of Patent: Oct. 12, 1993

[54] SECURE TRANSMISSION SYSTEM

[75] Inventor: Robert E. Maurer, North Andover, Mass.

[73] Assignee: AT&T Bell Laboratories, Murray Hill, N.J.

[21] Appl. No.: 485,491

[22] Filed: Apr. 18, 1983

Related U.S. Application Data

[63] Continuation-in-part of Ser. No. 468,505, Feb. 22, 1983, abandoned.

[51] Int. Cl.$^5$ ............................................. H04K 9/00
[52] U.S. Cl. .......................................... 380/21; 380/29; 380/44; 380/45
[58] Field of Search ................................ 375/2.1, 2.2; 178/22.08, 22.1, 22.13–22.16, 22.19; 380/29, 44, 45, 21

[56] References Cited

U.S. PATENT DOCUMENTS 4,249,180  2/1981  Eberle et al. .................. 375/2
4,484,025  11/1984 Ostermann et al. ............ 380/21

OTHER PUBLICATIONS

"Cryptography: A Primer" by Alan G. Konheim, 1981, pp. 288–293.

Primary Examiner—Salvatore Cangialosi
Attorney, Agent, or Firm—Charles E. Graves

[57] ABSTRACT

In a secure digital transmission system that may utilize the Data Encryption Standard, the message signal is encrypted according to a predetermined algorithm and a key. The key is selected from a library of key material according to a key index signal. The key index signal, which is transmitted to all stations that must decrypt the message signal and therefore subject to interception, is itself encrypted at each station to form the library addresses for key selection. Even though the key selection process is initiated by a transmitted signal, security remains high because in the key selection chain, clear text and associated cypher text are not available for analysis. The key for encrypting the key index signal may itself be selected in a similar manner, thereby cascading the system any number of times for further security. A pseudorandom bit stream generated and encrypted at each station and initialized by the transmitted key index signal can address the key library to provide continually changing key.

14 Claims, 3 Drawing Sheets

SECURE TRANSMISSION SYSTEM

This application is a continuation-in-part, of application Ser. No. 468,505, filed Feb. 22, 1983, now abandoned.

BACKGROUND OF THE INVENTION

This invention relates to cryptography, that is, the use of secret codes to maintain privacy of communications in the presence of an intruder. More particularly, it relates to the management and distribution of the keys to cryptographic codes.

Not very long ago, the use of cryptography was mostly limited to military and diplomatic communications. The privacy of the mails was sufficient for most business purposes. Today, however, most business communication is carried on almost instantaneously by electric means. The mails are considered too slow. Furthermore, with the explosion of computer technology, computers, customers and data bases often located in different parts of the country must interact on a routine basis. As a result, very large amounts of very sensitive data are transmitted back and forth. Since the transmission facilities may be terrestrial microwave radio, satellite or long wires, the opportunities for interception by an interested intruder are great. In addition, the sensitivity of many types of communications to interception by an intruder, or to the introduction of false information, or the erasing of information from a data bank, is often critical. In the instance of electronic funds transfer, for example, such interference by an intruder could be very rewarding for the intruder and disastrous to the system.

In the terminology commonly used in cryptography, encypherment or encryption is a transformation process by which the original text, called plain text or clear text, is replaced by cypher text. The reverse process is known as decryption or decypherment. A cryptographic system usually includes a whole family of transformations, each member of the family being uniquely identified by a particular parameter called a key. Changing the key, therefore, changes the transformation algorithm without changing the system. Thus, in order to decrypt the cypher text and recover the plain text, the recipient must know not only the system but the particular key as well. An intruder is said to have broken the cryptographic code when he has discovered the system and key. Since systems usually involve hardware and are in place over a period of time, they are subject to discovery. The security of the code, therefore, and all the data protected by it, lies in the security of the key.

The advances in digital computing and communications technology which have given rise to the need to protect so much business data, have also spawned many cryptographic systems which rely on intricate algorithms implemented by computer. Recognizing the extent of the need and the cost and availability advantages of standardization, the National Bureau of Standards has adopted a data encryption standard, as described in the Federal Information Processing Standards Publication No. 46, dated Jan. 15, 1977. The Data Encryption Standard (DES) specifies a general algorithm to be implemented in electronic hardware devices and used for cryptographic protection of computer data. Blocks of input data of 64 bits each are transformed under a 56-bit key using 16 rounds of permutations and substitutions to generate 64-bit cypher blocks.

Unfortunately, however, high speed computing technology is also available to sophisticated intruders who have a substantial interest in breaking a cryptographic code. It makes possible, for example, the trial of many different algorithms in a very short time. As a consequence, given knowledge of a system and access to clear text and associated cypher text, a well equipped intruder can, in time, derive the key used. Even with the large family of transformations implemented by the DES, security against sophisticated intruders therefore suggests frequent changing of the key.

The problem that this presents, however, in a communications system where the encrypter and decrypter are not colocated is obvious. All legitimate users must change to the same new key at the same time. Since it may well be desirable to change key at least every day, physical delivery of each new key is far too cumbersome. It is therefore necessary that the material for many keys be available at each location.

In one possible arrangement, many whole keys may be stored in one physical medium, such as a read-only memory. To keep all stations synchronized, the keys are used in the order in which they are stored, and all stations change key upon the same criteria. For example, all might change at 12:01 A.M., each day, or perhaps after each communication session. Such a system would obviously provide a very high degree of security, so long as each key is used only once. With an electronic system, however, an interruption in power, even of momentary duration, can cause the key selection apparatus to lose its place. Any resulting repeated use of a key reduces security, but if the system must return to the first key in order to synchronize all stations, the security is obviously drastically reduced. Such systems, therefore, in general, require back-up power to avoid interruption, an expensive necessity.

In an alternative arrangement, specific key material may be selected at each location from a bank or library of key material in accordance with an electronic signal. This signal, which may be called a key index signal, may specify the key directly or may provide the initial starting point of a predetermined process for choosing the key. The key index signal may even be chosen totally at random, but it must unambiguously define the key. In order to provide all communicating stations with the same key, however, it must be transmitted and therefore is as subject to interception as the encrypted message itself.

The text "Cryptography", A. G. Konheim, John Wiley & Sons, Inc., 1981, in Section 7.4 describes a system for end-to-end encryption using the DES algorithm. Operational keys which perform the message encypherment are encrypted by system keys, so that the key index signal sent to the receiver is an encrypted operational key. With high powered computing capability, a sophisticated intruder that could derive operational key could derive the key for decrypting the key index signal as well, gaining access to future operational keys.

An object of this invention is a more secure transmission system which has no need for backup power.

A second object is a more secure transmission system in which access to both key index and encrypted message does not enable access to future operational keys.

A third object of this invention is a more secure transmission system using the DES algorithm.

Still a fourth object is a more secure transmission system using the DES algorithm in which the key can be continually changed to provide running key.

SUMMARY OF THE INVENTION

In a secure transmission system wherein the message signal is encrypted for transmission according to a predetermined algorithm and a stored key, and the key is selected for storage from a key library according to a transmitted key index signal, the key index signal is itself encrypted and the key selected according to the encrypted key index signal. A key index signal may be encrypted for new key selection each transmission session according to the DES algorithm and another key that is changed daily, the daily key itself being selected from a day key library according to a transmitted random number. Finally, a new session may be continually selected from the session key library according to an encrypted pseudorandom bit stream.

DETAILED DESCRIPTION

Figure 1:
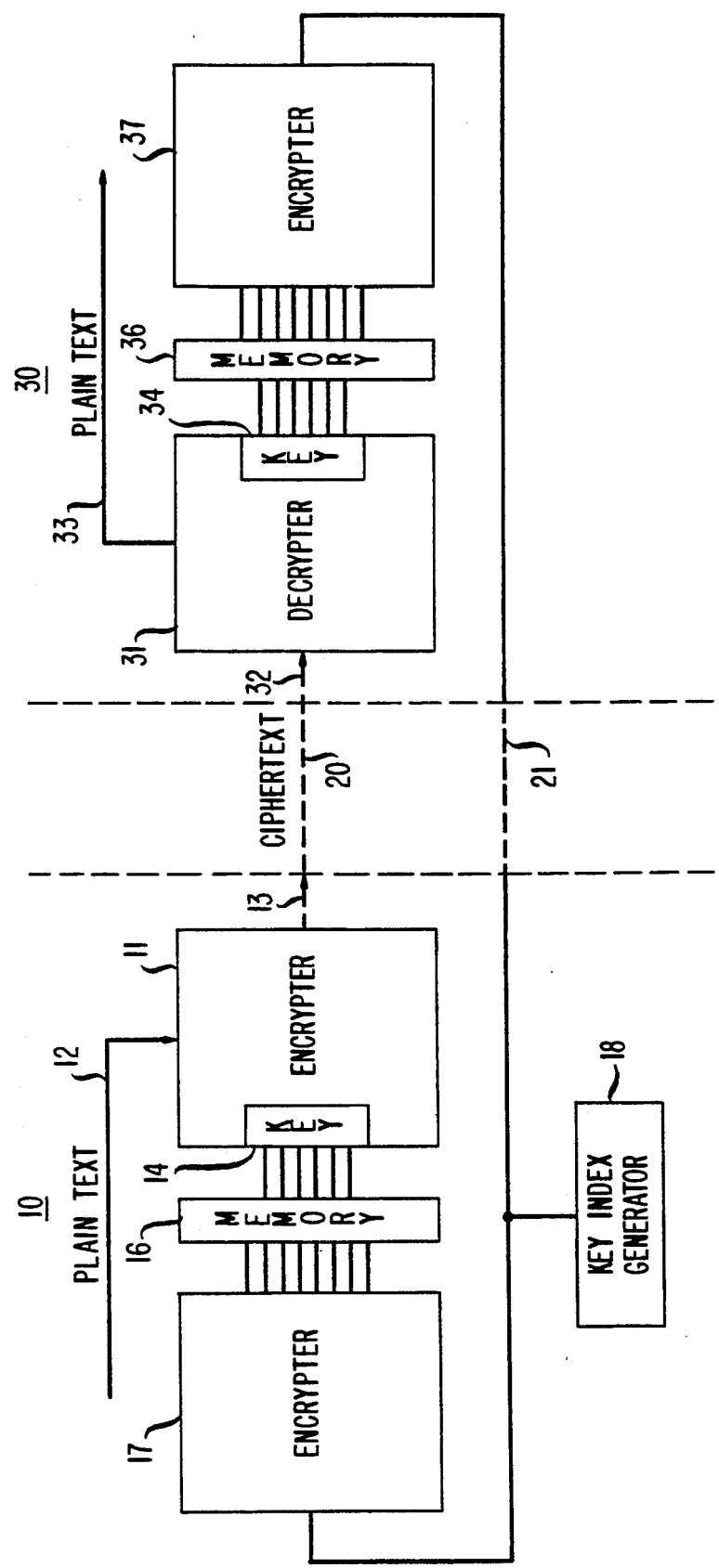
FIG. 1 is a block diagram of an embodiment of the invention.

In the embodiment of the invention depicted in FIG. 1, a secure transmission system includes at least a transmitting station 10 and a receiving station 30. In transmission station 10 a message encryption means 11 has an input 12, an output 13, and a stored key 14. A memory 16 is connected to key 14, and a key index encryption means 17 has its output connected to memory 16 and its input connected to the output of a key index generator 18. Similarly, at receiving station 30 a message decryption means 31 has an input 32, an output 33, and a stored key 34. A memory 36 is connected to key 34, and a key index encryption means 37 has its output connected to memory 36 and its input connected to key index generator 18 via a key index communication channel 21. The output 13 of message encryption means 11 is connected to the input 32 of message decryption means 31 via a message communication channel 20.

At transmitting station 10 encryption means 11 operates to encrypt a message signal on input 12 according to a predetermined algorithm and stored key 14. Stored key 14 is made up of elements selected from memory 16. At receiving station 30 decryption means 31 operates to decrypt the message signal on input 32 according to stored key 34 and a predetermined decryption algorithm. Stored key 34 is selected from memory 36 according to the key index signal from generator 18 after it has been encrypted by key index encryption means 37.

Encryption means 11 and decryption means 31 may use any number of available encryption methods which employ a changeable stored key. The encryption algorithm may be implemented, for example, by a general purpose computer, a microprocessor, a hard wired circuit, or even a mechanical device. Decryption means 31 must, of course, operate under its stored key to implement the complimentary process of encryption means 11 in order to recover the original message signal.

Memories 16 and 36 store a quantity of possible key elements in excess of what is required for any particular key. Memories 16 and 36 may also be implemented by a very wide range of devices that include not only volatile and non-volatile electronic memories, but physical and mechanical devices as well, such as punched cards and even printed circuit boards.

Key index encryption means 17 and 37 may employ an even wider choice of methods since they are not necessarily limited to the use of stored keys. Further, they need not implement complimentary processes since they both serve to provide an encrypted signal with which to select key. The ultimate requirement, of course, is that stored key 34 selected from memory 36 must operate in the decryption means 31 to regenerate the signal originally encrypted in encryption means 11 using stored key 14 which was selected from memory 16. For ease of implementation memories 16 and 36 may of course be identical and, therefore, keys 14 and 34 also identical. Key index generator 18 may be located anywhere as long as it delivers the same key index signal to both key index encryption means 17 and 37.

The strength of the invention as illustrated in FIG. 1 lies in the fact that an intruder does not have access to both clear text and associated cypher text within the key selection chain from which to derive future key information. That is, even if he has key index information from generator 18 and has derived an associated operational key 14, he still has not broken the key selection process.

Figure 2:
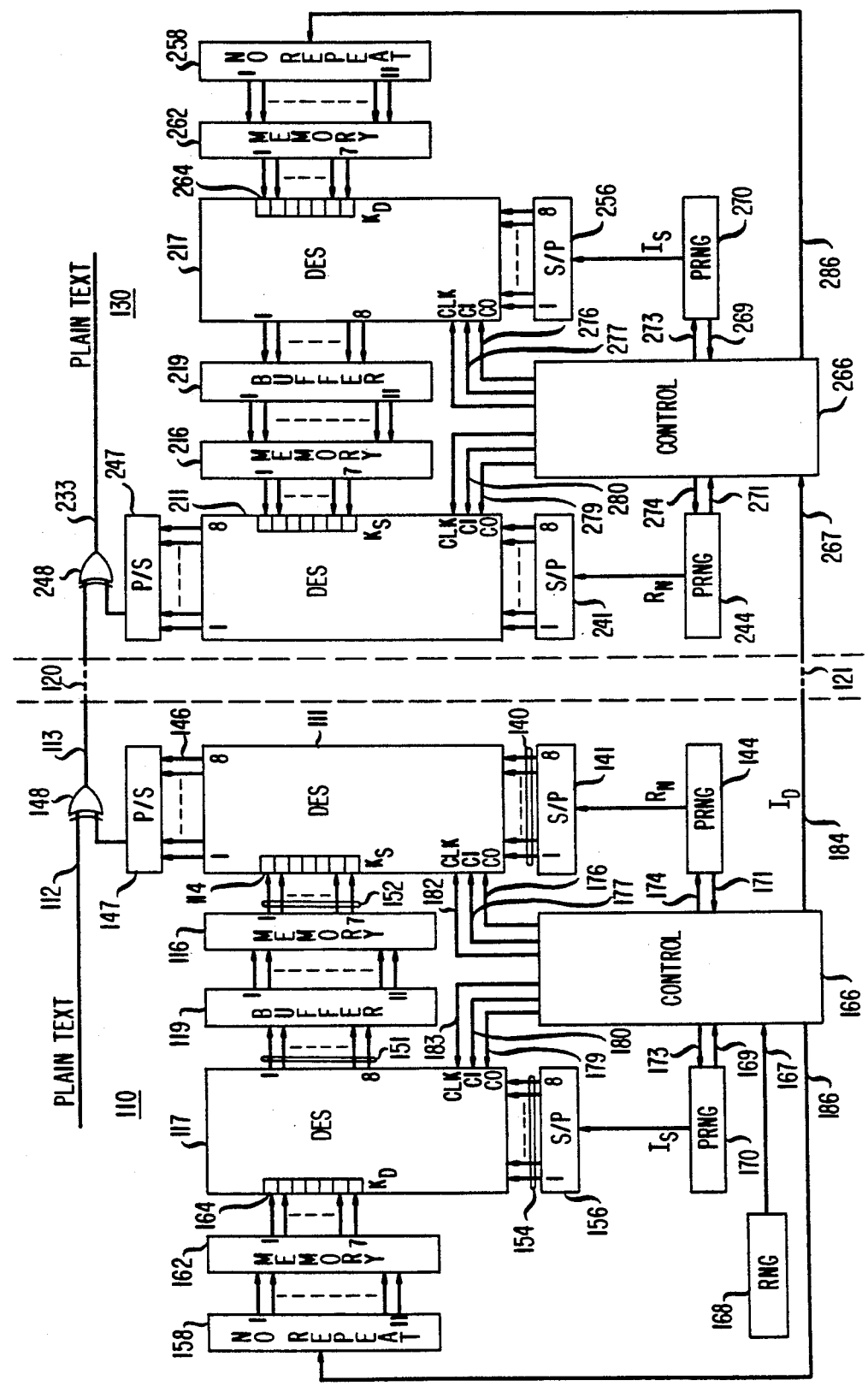
FIG. 2 is a block diagram of an embodiment of the invention using the DES algorithm and allowing continual key change.

A particularly advantageous embodiment of the invention for encrypting a digital signal is illustrated in the block diagram of FIG. 2. In this embodiment an encryption transmitting station 110 is connected via a full rate digital message channel 120 and a substrate control channel 121 to a decryption receiving station 130. In transmitting station 110 message encryption means 111 may be constructed to implement the Data Encryption Standard and will, henceforth, be termed DES 111. Parallel input leads 140 to DES 111 are connected to a serial-to-parallel converter 141, which is in turn connected to the output of a pseudorandom number generator 144. The eight parallel outputs 146 of DES 111 are connected to a parallel-to-serial converter 147, which in turn is connected to one input of an EXCLUSIVE-OR gate 148. The other input 112 to gate 148 receives the plain text input signal, and the output 113 carries the cypher text output and delivers it to connecting channel 120. A second DES 117 has its parallel outputs 151 connected to a buffer 119, the parallel outputs of which are connected to memory 116. Outputs 152 of memory 116 are connected to the key input of DES 111. The parallel inputs 154 of DES 117 are connected via a serial-to-parallel converter 156 to the output of a pseudorandom number generator 170. A control circuit 166 has a first input 167 connected to the output of a random number generator 168 and second and third inputs 169 and 171 connected into the respective feedback loops of PRNGs 170 and 144. Outputs 173 and 174 are also connected into the feedback loops of PRNGs 170 and 144, respectively. Outputs 176 and 177 are connected to respective control inputs of DES 111 and outputs 179 and 180 to respective control inputs of DES 117. Control output 182 is connected to the clock input of DES 111 and output 183 to the clock input of DES 117; output 184 is connected to the subrate channel 121. The tenth output, 186, of control 166 is connected to a no repeat circuit 158. The parallel outputs of a no repeat circuit 158 address memory 162, the outputs of which are connected to the key inputs of DES 117.

The decrypter-receiver 130 is almost identical to encrypter-transmitter 110; its corresponding parts are identified by corresponding numbers of the 200 series.

The embodiment of FIG. 2 operates to encrypt a pseudorandom number of a very long sequence to form an encrypted bit-stream, which then is modulo-2 added in exclusive ORgate 148 with the message signal to form the cypher text that is transmitted over channel 120. In receiver 130 the same pseudorandom number from generator 244 is encrypted in the same manner by DES 211 to form the same encrypted bit-stream into exclusive ORgate 248, which is then modulo-2 added to the cypher text from channel 120 to reproduce the plain text out. Since both encrypter 110 and decrypter 130 operate to form the identical encrypted bit-stream, the following explanation of the operation of encrypter 110 will also apply to decrypter 130.

To initiate the encryption process in the embodiment of FIG. 2 a key must first be entered into DES 117. Since this may be conveniently accomplished, for example, once a day, it will be termed a "day key". Control 166 connects its input 167 to output 186, thereby feeding random bits from random number generator 168 to no-repeat circuit 158. Circuit 158 accumulates the bits in a memory to form address bytes for memory 162. Each new byte is compared with all previous bytes. Unique bytes are accumulated, and repeat bytes are rejected until eight different bytes are accumulated. Subsequent new unique bytes replace the oldest accumulated bytes, which are outputted to address memory 162. Control 166 connects the proper logic to outputs 179 and 180 to enter as the day key the contents of the memory 162 addressed by the random bytes.

The next step in the initiation process is to initialize the pseudorandom number generator 170. As is well known, a pseudorandom number generator may be merely a long shift register with feedback. Control 166 opens the connection between input 169 and output 173 to open the feedback loop of PRNG 170 and feeds random bits from RNG 168 to output 173 to fill the register in PRNG 170. Once the register is filled with random bits, input 169 is again connected to output 173 and PRNG 170 begins producing its pseudorandom bit-stream.

DES 117 is now set to produce key for DES 111. Control 166 applies the proper logic to leads 179 and 180 to cause DES 117 to enter data, i.e., the output of PRNG 170, until eight bytes of 8-bits each have been entered. The logic on leads 179 and 180 is then altered to cause DES 117 to encrypt the entered data with the DES algorithm and the stored key 164. After encryption, control 160 applies the logic to leads 179 and 180 to output the encrypted data to buffer 119 where it accumulates to form address bytes for memory 116. Upon command of control 166 via outputs 176 and 177 DES 111 enters the key bytes stored at the addressed locations of memory 116 to form key 114. Since this may be accomplished every transmission session, it may conveniently be termed a session key. Alternatively, as will later be shown, new keys may be entered into DES 111 for every 64 bit block of input data; in this usage, the key 114 may be termed running key.

It should be noted that when running key is not needed, PRNG 170 is not necessary either. Random bits from RNG 168 may be connected to serial-to-parallel converter 156 to form data bytes for encryption by DES 117.

Control 166 may now initialize PRNG 144 via ports 171 and 174 with random bits from RNG 168 in a manner similar to that described with respect to PRNG 170. Its pseudorandom bit stream will be encrypted by DES 111 in the electronic code book mode to form a continuous key stream for nodulo two addition with the plain message text.

It will be obvious that in order to provide the identical encrypted bit stream at the outputs of parallel-to-serial converters 147 and 247, identical corresponding encryption algorithms, day keys, session keys and pseudorandom bit streams must be used. The contents of the corresponding key library memories at both encryption and decryption stations must be identical. Furthermore, the random numbers which are used to address the corresponding day key library memories and to initialize the respective corresponding pseudorandom number generators must be identical. Control 166, therefore, corresponds with control 266 via subrate channel 121. A code word identifying the initialization process may be sent, then the random numbers themselves from RNG 168. Since the random numbers are only used for initializing the system and generating day key, the rate at which they are transmitted is not important. Therefore, a very low bit rate channel may be used for channel 121. Alternatively, it will be obvious to those skilled in the art, the same information may be transmitted over channel 120 at any bit rate. The national telephone network may be used, therefore, with or without common channel inter-office signalling (CCIS).

To implement the embodiment of the invention shown in FIG. 2, memories 116 and 162, which form the session key and day key libraries respectively, may be any medium capable of storing seven-bit key bytes in a large number of addresses. If the number of addresses is 256, there is no need for buffer 119, as eight-bit data bytes from DES 117 can directly address memory 116. It is particularly useful in thwarting intruders; however, if the number of addresses is much larger than the number of possible key bytes. For example, the key libraries may advantageously be preprogrammed Read Only Memories PROMs) having 2048 bytes of memory. Since the DES uses seven-bit bytes, the maximum number of different key bytes is $2^7$ or 128, and statistically there is an average of 16 different addresses for each particular key byte. An intruder who may have recovered the key for a particular block of data cannot determine which address in the memory each key byte came from. The 2048-byte memories will, of course, have 11 inputs to address all bytes. Thus, no-repeat circuit 158 will require 11 outputs, and buffer 119 is needed to accumulate the 8-bit bytes out of DES 117 into the requisite 11-bit bytes. Inclusion of buffer 119, however, provides a substantial advantage of allowing the session key to be changed every 64-bit block of input data.

To implement the Data Encryption Standard (DES), integrated circuits and instructions are available commercially from several suppliers. Fairchild Instruments Data Encryption Set 9414 includes four integrated circuit chips each comprising a pair of data registers, four 8-bit shift registers, control logic, and two 64-word 4-bit read-only memories. When the chips are connected and powered according to instructions provided by Fairchild, a 56-bit key stored in eight bytes of seven bits each is used to encypher a 64-bit data word that is stored in eight bytes. Separate data inputs and outputs allow input and output at the same time, and 16 steps of encryption are performed on each 8-byte word. Every 64-bit block of data, therefore, can be encrypted in 24 externally supplied clock pulses at a rate of up to 5 MHz.

The DES operation is controlled in the 9914 set by binary logic applied to three leads labelled $C_0$, $C_1$, $C_2$, respectively. Since both transmitter and receiver operate to encrypt the pseudorandom number in the embodiment of FIG. 2, however, classic decryption is not needed, and the $C_2$ lead may be permanently wired high, i.e., to +5 volts, or logic 1. All of the required DES functions may, therefore, be controlled by logic on just two leads, $C_0$ and $C_1$, which correspond to the control inputs shown on the various DESs of FIG. 2.

If the externally supplied clock rate is judiciously varied, even though the DES employs a batch process on a block of 64 bits of input data, continuous encryption of an input bit stream can be accomplished. Furthermore, the embodiment of FIG. 2 can be used to provide continuous key change; that is, running key.

Control 166 provides the logic and clock to DESs 117 and 111 and connects random number generator 168 to select day key and to initiate the PRNGs. It can be implemented in hardware, software, or firmware. Table 1 shows the necessary connections, logic and clock rates to cause an embodiment of FIG. 2 to operate at a throughput of 256 kilobits per second with running key. This data is sufficient to allow one of ordinary skill in data control circuits to design a satisfactory control circuit.

In this particular arrangement RNG 168 may output at 1 kb/s. Therefore, the registers in PRNGs 170 and 144 will be loaded at the 1 kb/s rate. No repeat circuit 158 will accumulate bits at 1 kb/s to form 8 unique eleven-bit bytes. The random bits from RNG 168 are also transmitted to receiver control circuit 266. As previously mentioned, any medium may be used for this transmission. If a separate channel 121 is used, the very low bit rate allows time division multiplexing with many other signals, adding to the difficulty of intrusion.

verter 156 can output and DES 117 load data at 64 kb/s. Since DES 117 can load and unload data at the same time, a continuing 64 k-bytes/s can be maintained if encrypting is performed between load/unload steps. A 2048 kHz clock rate performs all 16 encryption steps in 31.25 microseconds. This is one half the time allotted to each load/unload step and enough to avoid interference.

In the example of Table 1 PRNG 144 outputs $R_N$, a pseudorandom bit stream, at 256 kb/s, the system throughput rate. S/P 141 outputs 8-bit bytes for DES 111 to load and unload data at a 32 kb/s rate. Encryption is performed between load-unload steps at 1024 kHz. Key is loaded from memory 116 also between $R_N$ data load steps. Since key is used only for encryption, it need be in place only after the eighth data byte is loaded and until the next first byte is loaded. Key therefore may be loaded between any other data bytes. It is more convenient, however, if the timing of the load step is symmetrical with that of the encrypt step. The key is therefore loaded between the fourth and fifth data byte. Buffer 119 receives encrypted key index bytes of eight bits at 64 kb/s. It discards five bits of every other received byte to accumulate eight 11-bit bytes. These eight bytes are unloaded to memory 116 and key is loaded into DES 111 at 1024 kb/s per second.

Figure 3:
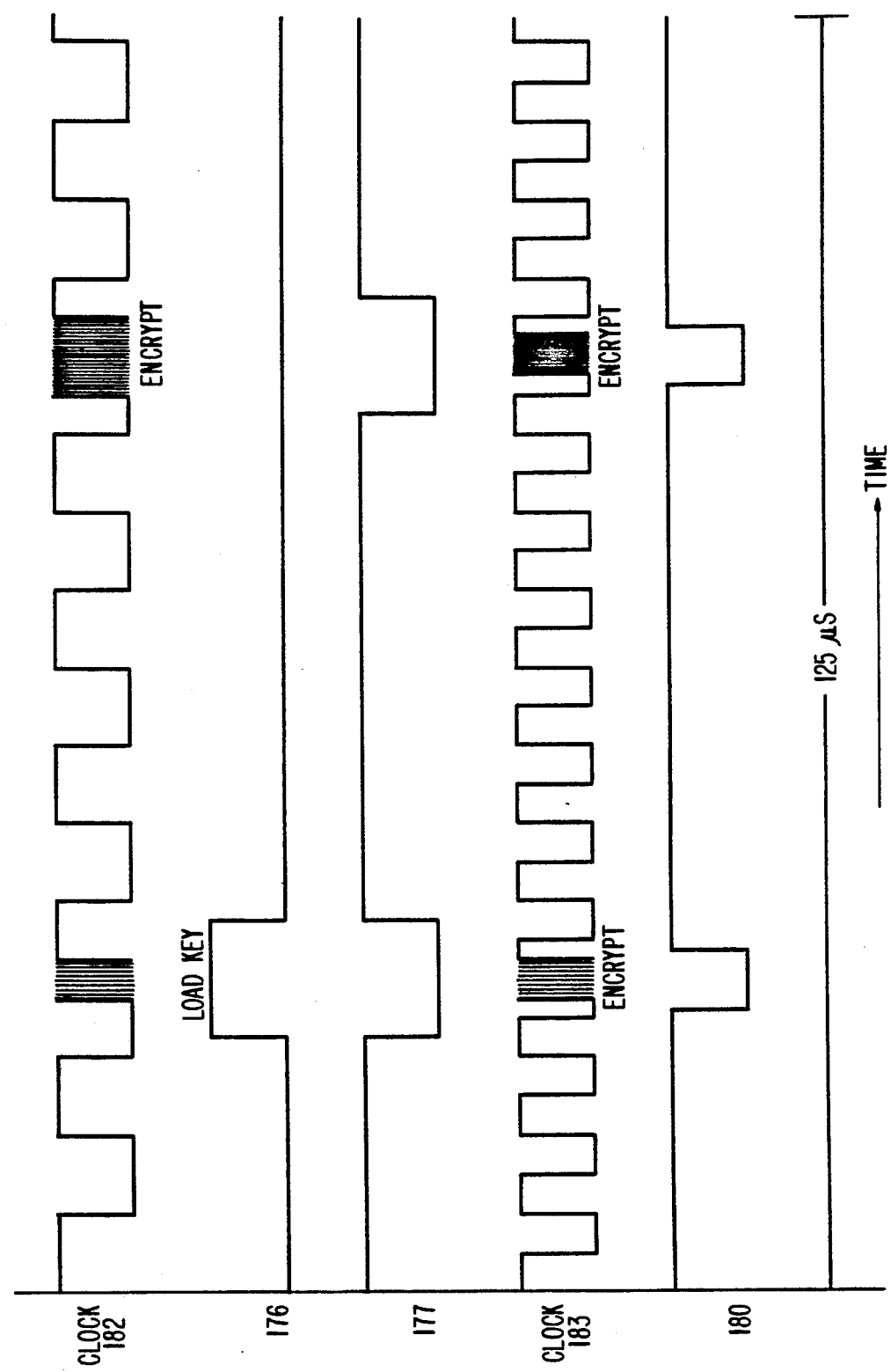
FIG. 3 is a plot of various control signals which may be used in connection with the embodiment of FIG. 2.

The timing waveforms of FIG. 3 further illustrate the manner in which these processes interleave. Activity is assumed to occur on the negative going edge of each clock pulse and each waveform is labeled according to the output of 166 to which it is applied. It can be seen that waveform 176 is low and 177 is high for each regularly occurring 32 kHz clock pulse on output 182. Since this is the data load/unload mode of DES 111, it provides a steady throughput of 32 kb/s. Clock 182 shifts to 1024 kHz after each four 32 kHz clock pulses and within the period when waveform 177 is low. Sixteen clock pulses at 1024 kHz are needed for encryption when waveform 176 is also low and eight for loading key when 176 is also high.

| FUNCTION | CONNECTIONS FOR CONTROL CIRCUIT ||||||||||||
|---|---|---|---|---|---|---|---|---|---|---|---|---|
| | CONTROL OUTPUTS ||||||||||||
| | 173 PRNG | 179 $C_0$ | 180 $C_1$ | 186 | 184 | 174 PRNG | 176 $C_0$ | 177 $C_1$ | 183 CLK kHz | 182 CLK kHz | CYCLES | TIME |
| Initialize | 167 | | | 167 | 167 | 167 | | | | | | |
| Load Day Key | | HI | LO | 167 | 167 | | | | .060 | | 8 | 133333 |
| Load/Unload $I_S$ | 169 | LO | HI | | | 171 | | | 64.0 | | 8 | 125 |
| Encrypt $I_S$ | | LO | LO | | | | | | 2048 | | 16 | 7.8125 |
| Load/Unload $I_S$ | | LO | HI | | | | | | | 64.0 | 8 | 125 |
| Encrypt $I_S$ | | LO | LO | | | | | | | 2048 | 16 | 7.8125 |
| Load/Unload $R_N$ | | | | | | | LO | HI | | 32.0 | 4 | 125 |
| Load $K_S$ | | | | | | | HI | LO | | 1024 | 8 | 7.8125 |
| Load/Unload $R_N$ | | | | | | | LO | HI | | 32.0 | 4 | 125 |
| Encrypt $R_N$ | | | | | | | LO | LO | | 1024 | 16 | 15.625 |

Alternatively, of course, these random bits may be transmitted over the main channel 120 at 1 kb/s or any faster rate.

If day key is loaded into DES 117 at the rate of 60 bytes per second, enough time is allotted to allow the no-repeat circuit to operate. Memory 162 is, of course, addressed at the same rate. Since this set up occurs only once a day, the fraction of a second that it takes is not material.

The timing for loading session key into DES 111 is a little more complicated because it involves encrypting $I_s$, the output from PRNG 170 in DES 117. With PRNG 170 outputting at 512 kb/s series-parallel con- Except for loading day key, which occurs only, for example, once each day, output 179 of control 166 remains low and hence is not graphed. The clock applied to output 183 shifts from 64 kHz to 2048 kHz after every eight 64 kHz pulses in a similar manner, in order to encrypt the session key stream. The phase relationship between clock 183 and 182 is not important if buffer 119 has a capacity of at least nine bytes. The relationship shown in FIG. 3, however, in which the eight load-key pulses of waveform 182 and the 16 encrypt pulses of waveform 183 both occur between the same 64 kHz pulses, allows eight bytes to suffice.

I have shown, therefore, in FIG. 2 a secure transmission system that can be easily built by one skilled in the art from available materials. The only transmitted signal subject to intruder interception besides the cypher text is a random number needed to select the day key and initialize the PRNGs. Armed with this information and even an identical terminal, but absent the specific key library memories, there is no known way in which an intruder can recover the contents of the memories in any reasonable time period and therefore break the code. Memories may thus be produced in secret and be changed only very infrequently with no fear of loss of security. For even longer memory longevity the session key may be encrypted by several cascaded DESs each with its individual day key chosen from its individual key library memory. Succeeding DESs may re-encrypt the encrypted session key index, or alternatively, each DES may encrypt the key index of the following DES in a manner similar to that of the embodiment of FIG. 2.

It will be obvious to those skilled in the art of secure transmission that other arrangements than those illustrated can be produced without departing from the scope and spirit of the invention. It is not necessary, for example, to utilize the DES algorithm; other encryption means can be used in which the key is selected from a key library according to a key index signal that is encrypted for key selection after transmission. The DES itself can also be implemented in other structures. Advanced Micro Devices Inc. of Sunnyvale, Calif., for example, markets a microprocessor controlled DES which one skilled in the art can use to practice the invention with rather simple software.

What is claimed is:

1. A secure transmission system having a transmitting terminal (10) for encrypting and transmitting a message signal and a receiving terminal (30) for receiving and decrypting said message signal, said transmitting terminal comprising:
   message encryption means (11) for encrypting a message signal according to a predetermined algorithm and a key (14),
   first key library means (16) containing a number of possible key elements in excess of the number of elements in said key, and
   first key selection means for selecting said key from said first key library according to a key index available to both said transmitting and said receiving terminals,
   said receiving terminal comprising,
   second key library means (36) similar to said first key library means,
   second key selection means for selecting said key according to said key index, and
   message decryption means (31) for decrypting said encrypted message signal with the use of said key
   CHARACTERIZED IN THAT
   said transmitting and receiving terminals each further comprise key index encryption means (17,37) for encrypting said key index, said key being selected according to said encrypted key index.

2. A secure transmission system as in claim 1, wherein said message encryption means (111) and said message decryption means (211) each implement the Data Encryption Standard (DES).

3. A secure transmission system as in claim 1, further comprising random number generating means (11) for generating a train of random bits, wherein said key index is the selective output of said random number generating means.

4. Apparatus (110,130) for reversibly translating a message signal between clear text and cypher text comprising,
   means for generating a first pseudorandom bit stream (144,244),
   first encryption means (111,211) for encrypting said first pseudorandom bit stream according to a predetermined algorithm and a key,
   key library memory means (116,216) for storing possible key elements,
   key selection means for selecting said key from the contents of said key library memory according to an accessible key index, and
   modulo-two addition means (148,248) for adding said encrypted bit stream to said message signal to translate clear text into cypher text and cypher text into clear text,
   CHARACTERIZED IN THAT
   said apparatus further comprises key index encryption means (117,217) inaccessibly connected to said key library memory, said key being selected according to said encrypted key index.

5. Apparatus as in claim 4, wherein said first encryption means implement the Data Encryption Standard.

6. Apparatus as in claim 4, wherein said key index is the selected output of a random number generator.

7. Apparatus as in claim 5, wherein said key index encryption means implement the Data Encryption Standard.

8. Apparatus as in claim 7, further comprising means (170,270) for generating a pseudorandom key index bit stream for encryption by said key index encryption means, and
   buffer storage means (119,219) connected between said key index encryption means and said key library memory means for temporarily storing said encrypted key index bit stream in the form of addresses for said key library until needed by said first encryption means to provide running key.

9. Apparatus as in claim 7, wherein said key index encryption means encrypts said key index according to a day key having a longer life than said key, and further comprising day key library memory means (162,262) said day key being selected from said day key library according to a day key index.

10. Apparatus as in claim 8, wherein said means for generating a first pseudorandom bit stream and said means for generating a pseudorandom key index bit stream are initialized according to the output of a random number generator (168).

11. Apparatus as in claim 9, wherein said day key index is the selective output of a random number generator (168).

12. Apparatus as in claim 11, further comprising no repeat means (158) connected between said random number generator and said day key library memory means for accumulating the output of said random number generator into addresses for said day key library memory means, and discarding repeated addresses to form said day key index.

13. Apparatus for encrypting a message signal according to an available key index comprising:
   encryption means (11) for encrypting said message signal according to a predetermined algorithm and a key (14), key library memory means (16) for storing possible key elements, and key index encryption means (17) for encrypting said key index to form addresses of said key library memory means, said addresses thereby selecting said key for said encryption means.

14. Apparatus for decrypting a message signal, said message signal having been encrypted according to a predetermined algorithm and a key, said key having been selected from the contents of a first key library according to an encrypted key index comprising:

decryption means for decrypting said message according to an inverse algorithm of said predetermined algorithm and said key, a second key library substantially identical to said first key library, key index encryption means for encrypting said key index, and key selection means for selecting said key for said decryption means from said second key library according to said key index.

* * * * *